United States Patent
Zhang et al.

(10) Patent No.: US 7,640,381 B1
(45) Date of Patent: Dec. 29, 2009

(54) INPUT/OUTPUT DECOUPLING SYSTEM METHOD HAVING A CACHE FOR EXCHANGING DATA BETWEEN NON-VOLATILE STORAGE AND PLURALITY OF CLIENTS HAVING ASYNCHRONOUS TRANSFERS

(76) Inventors: Ji Zhang, 16225 Oakhurst Dr., Monte Sereno, CA (US) 95030; Hain-Ching Liu, 42600 Palm Ave., Fremont, CA (US) 94539; Jian Gang Ding, 1218 Mayberry La., San Jose, CA (US) 95131

( * ) Notice: Subject to any disclaimer, the term of this patent is extended or adjusted under 35 U.S.C. 154(b) by 363 days.

(21) Appl. No.: 11/325,970

(22) Filed: Jan. 4, 2006

Related U.S. Application Data

(60) Provisional application No. 60/725,057, filed on Oct. 7, 2005.

(51) Int. Cl.
*G06F 3/00* (2006.01)
*G06F 13/00* (2006.01)

(52) U.S. Cl. .................... 710/56; 710/5; 710/52; 711/141; 711/151

(58) Field of Classification Search ............ 710/56, 710/5, 52; 711/141, 151
See application file for complete search history.

(56) References Cited

U.S. PATENT DOCUMENTS

| | | | |
|---|---|---|---|
| 5,313,585 A | | 5/1994 | Jeffries et al. |
| 5,513,224 A | * | 4/1996 | Holt .................... 375/372 |
| 5,524,268 A | * | 6/1996 | Geldman et al. ........... 710/5 |
| 5,809,560 A | | 9/1998 | Schneider |
| 5,903,283 A | * | 5/1999 | Selwan et al. .......... 345/535 |
| 5,951,658 A | * | 9/1999 | Daray et al. ............. 710/56 |
| 5,974,503 A | * | 10/1999 | Venkatesh et al. ........ 711/114 |
| 6,119,243 A | * | 9/2000 | Garney et al. ........... 713/600 |
| 6,134,625 A | * | 10/2000 | Abramson .............. 710/241 |
| 6,192,428 B1 | * | 2/2001 | Abramson et al. ......... 710/52 |
| 6,219,728 B1 | * | 4/2001 | Yin ..................... 710/52 |
| 6,260,119 B1 | * | 7/2001 | Garney et al. ........... 711/150 |
| 6,330,646 B1 | * | 12/2001 | Clohset et al. .......... 711/158 |
| 6,351,780 B1 | * | 2/2002 | Ecclesine ............... 710/22 |
| 6,351,783 B1 | * | 2/2002 | Garney et al. ........... 710/107 |
| 6,449,702 B1 | * | 9/2002 | Witter et al. ............ 711/158 |
| 6,484,201 B1 | * | 11/2002 | Garney et al. ........... 709/224 |
| 6,484,235 B1 | | 11/2002 | Horst et al. |
| 6,704,763 B1 | * | 3/2004 | Gulick ................. 718/100 |
| 6,715,054 B2 | | 3/2004 | Yamamoto |
| 6,760,808 B2 | | 7/2004 | Peters et al. |

(Continued)

FOREIGN PATENT DOCUMENTS

WO   WO 2005/020062   *   3/2005

(Continued)

*Primary Examiner*—Tammara Peyton
(74) *Attorney, Agent, or Firm*—Stolowitz Ford Cowger LLP

(57) ABSTRACT

An I/O decoupling system comprising an I/O accelerator coupled between a host interface and a channel interface, wherein the I/O accelerator comprises a host manager, a buffer manager a function manager, and a disk buffer. The host manager is coupled to the host interface to receive a request from a connected host computer. The function manager in response to receiving the request allocates the disk buffer and determines a threshold offset for the buffer while coordinating the movement of data to the disk buffer through the channel interface coupled to the disk buffer.

34 Claims, 3 Drawing Sheets

U.S. PATENT DOCUMENTS

| | | | |
|---|---|---|---|
| 6,895,003 B1 * | 5/2005 | Kobayashi et al. | 370/389 |
| 6,938,143 B2 * | 8/2005 | Le | 711/172 |
| 7,120,113 B1 * | 10/2006 | Zhang et al. | 370/229 |
| 7,318,090 B1 * | 1/2008 | Fairman et al. | 709/223 |
| 2003/0126380 A1 * | 7/2003 | Mastronarde et al. | 711/151 |
| 2005/0138255 A1 * | 6/2005 | Moyer et al. | 710/260 |

FOREIGN PATENT DOCUMENTS

WO    WO 2005/020062 A1 *    3/2005

\* cited by examiner

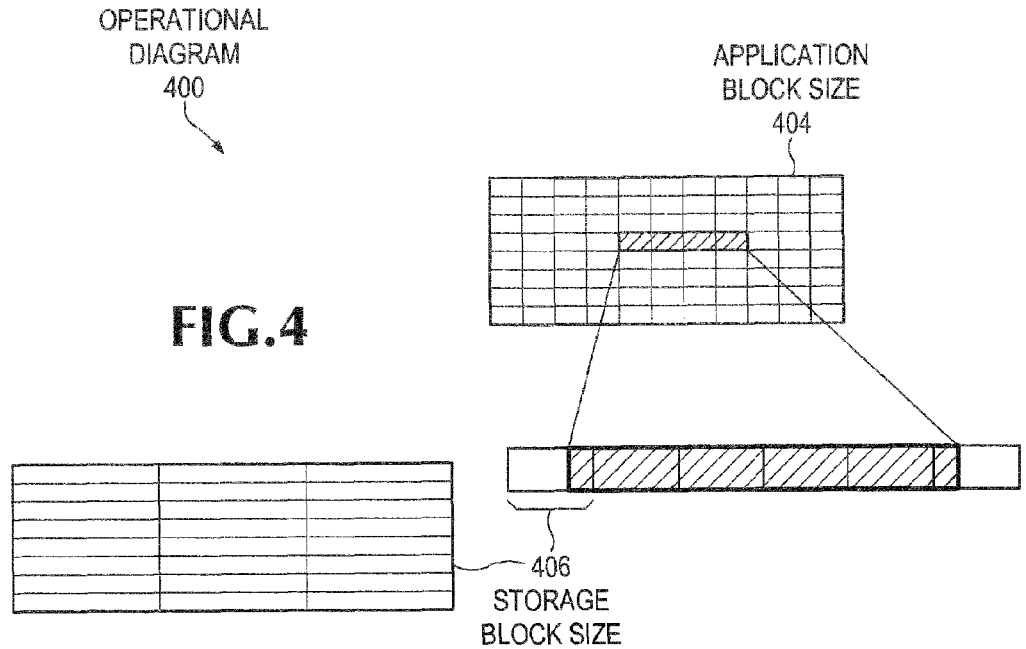

INPUT/OUTPUT DECOUPLING SYSTEM METHOD HAVING A CACHE FOR EXCHANGING DATA BETWEEN NON-VOLATILE STORAGE AND PLURALITY OF CLIENTS HAVING ASYNCHRONOUS TRANSFERS

CROSS-REFERENCE TO RELATED APPLICATION

This application claims the benefit under 35 USC 119(e) of U.S. Provisional Patent Application Ser. No. 60/725,057, entitled "I/O Decoupling System," filed Oct. 7, 2005, and the subject matter thereof is also hereby incorporated herein by reference thereto.

FIELD OF INVENTION

The present invention relates generally to storage system architectures, and more particularly to a system for improving disk drive based storage systems by I/O decoupling.

BACKGROUND OF INVENTION

Advances in semiconductor technology have delivered processors with more computing power than that of a mainframe. While processing speed has increased tremendously, the input/output (I/O) speed of secondary storage devices such as disk drives has not kept pace. As the processing throughput of the system depends in part on the slowest component, the bottleneck associated with an unduly slow storage system may neutralize the speed advantages of a fast host processor. Additionally, the use of multiple applications may further accentuate the imbalance between the host computer and the peripheral I/O performance. Thus, a high performance disk drive system has become requisite in a modern computer. In order to address the performance requirement, a random array of independent disks (RAID) is used to store data on several disks concurrently.

Typically, disk I/O performance is dominated by the time mechanical parts of the disk move to a location where the data is stored. After a disk controller receives an instruction from a consumer or an application, the disk controller causes a disk drive motor to actuate disk heads to move to the appropriate location and retrieves the requested data. The time required to position the disk head over the recording surface of a disk is known as a seek time. Seek times for random disk accesses are, on the average, orders of magnitude longer than the data transfer times if a semiconductor memory device were accessed. Additionally, because the disk drives have spinning magnetic media platters, a rotational latency while the platter spins to get the data in place for reading is also introduced. These rotational latencies are also orders of magnitude greater than the data transfer times of the semiconductor memory devices. For example, in an enterprise level disk drive performing a track read and a ⅓ stroke seek followed by a track read, the relative time required to read the data on a first track and a second track is to perform a seek across ⅓ of the disk surface. A seek settle time is the amount of time required to move the head from an initial track, the first track, to a target track, such as the second track, and stop the head from moving across the track. In the best performance 3.5" disk drives available today, the seek settle time can be 3.5 mS, while a single track of data can be read in about 139 μS at 7200 RPM or 100 μS at 10,000 RPM. This demonstrates the dramatic reduction in data performance whenever the head must be relocated.

To minimize the seek and rotational time delays, disk systems incorporate RAID controller based disk caches which take advantage of the principle of locality of references well known in the computer programming art. Typically, the data from the disk is buffered by a large semiconductor memory within the RAID controller that has a relatively fast access time. If the data requested by the application already resides in the cache memory, the RAID controller can transfer the data directly from the cache memory to the requesting application. Performance is increased because accessing data from the cache memory is substantially faster than accessing data from the disk drive.

Although often quite effective, such a cache can experience a performance degradation caused in part by the sensitivity of the disk cache to cache hit statistics. A disk cache system having a low hit rate may perform more poorly than an uncached disk due to caching overhead and queuing delays, among others.

One factor affecting the cache performance is the size of the disk cache. With a limited cache memory, a multitude of requests over a variety of data segments can easily exhaust the capability of the disk cache system to retain the desirable data in the cache memory. Often, data that may be reused in the near future is flushed prematurely to make room in the cache memory for handling new requests from the host computer, leading to an increase in the number of disk accesses to fill the cache. The increase in disk activity, also known as thrashing, institutes a self-defeating cycle in which feeding the cache with data previously flushed disproportionately impacts the disk drive utilization.

A related factor affecting the hit rate is the cache memory block size allocation. An allocation of a relatively large block of memory reduces the quantity of individually allocatable memory blocks. In systems having multiple concurrent tasks and processes that require access to a large number of data files, a reduction in the number of individually allocatable blocks increases the probability of the rate of cache block depletion, once more leading to disk thrashing which decreases the overall disk system throughput.

Another factor affecting the performance of the disk cache is the read-ahead policy for prefetching data into the cache. Prefetching data into the cache enhances performance when the application, or consumer, issues sequential data requests. However, in the event that the data is accessed in a random manner, the prefetching policy may be ineffective as data brought into the cache is not likely to be used again soon.

Additionally, the prefetching policy may cause a bottleneck on the disk data path, as each attempt to prefetch data from the disk into the cache memory potentially creates a contention for the data path between the disk drive and the application. Thus, an automatic prefetch of data in a system with a large percentage of random I/O operations may degrade the overall system performance. As a result, the prefetching of data into the cache memory must be judiciously utilized to minimize the data path contention and the overhead associated with loading data into the cache.

Thus, a RAID controller system is needed to minimize the seek and rotational latency and low data transfer rates commonly associated with disk accesses. Further, it is desirable that the read ahead disk cache minimizes the loss of performance which occurs when random accesses occur frequently.

In view of the ever-increasing demand for applications that require access to very large data files, such as video on demand, it is increasingly critical that answers be found to these problems. Solutions to these problems have been long sought but prior developments have not taught or suggested any solutions and, thus, solutions to these problems have long eluded those skilled in the art.

SUMMARY OF INVENTION

The present invention provides an I/O decoupling system comprising an I/O accelerator coupled between a host interface and a channel interface, wherein the I/O accelerator comprises a host manager, a buffer manager, a function manager, and a disk buffer. The host manager is coupled to the host interface to receive a request from a connected host computer. The function manager then allocates the disk buffer and calculates a threshold offset for the disk buffer in response to receiving the request. The function manager also coordinates the movement of data to the disk buffer through the channel interface coupled to the disk buffer, while the buffer manager monitors the disk buffer to detect the threshold offset.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF DRAWINGS

FIG. 4 is an operational diagram for dynamic block size translation; and

FIG. 5 is a flow chart of a system for an I/O decoupling system in an embodiment of the present invention.

BEST MODE FOR CARRYING OUT THE INVENTION

Figure 1:
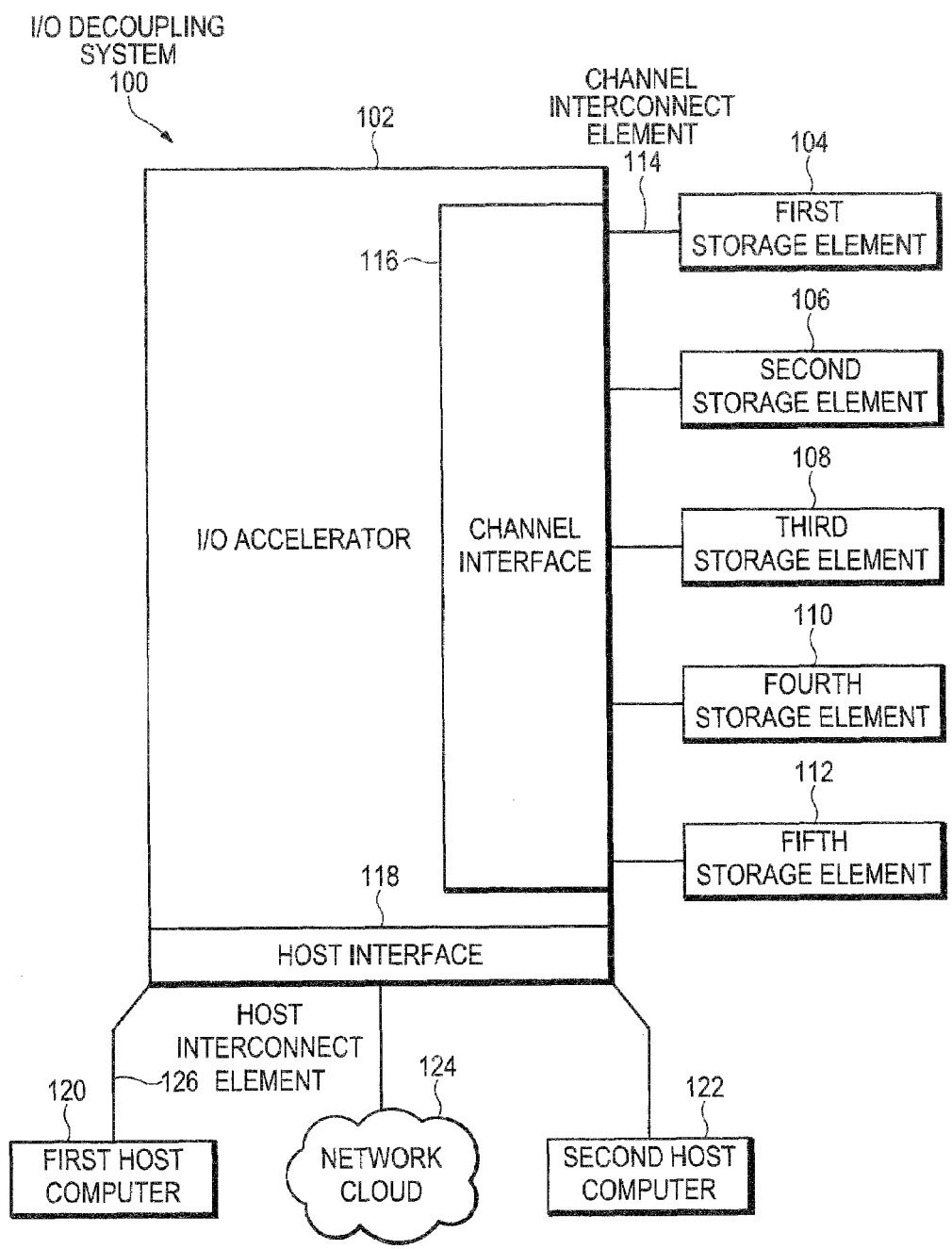
FIG. 1 is a block diagram of an I/O decoupling system in an embodiment of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the device are semi-diagrammatic and not to scale and, particularly, some of the dimensions are for the clarity of presentation and are shown greatly exaggerated in the drawing FIGS. The same numbers are used in all the drawing FIGS. to relate to the same elements. The term "horizontal" as used herein is defined as a plane parallel to the conventional plane or surface of the present invention, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

Referring now to FIG. 1, therein is shown a block diagram of an I/O decoupling system 100 in an embodiment of the present invention. The block diagram shows an I/O accelerator 102, a first storage element 104, such as a disk drive, a disk array, RAID or a memory device, a second storage element 106, a third storage element 108, a fourth storage element 110 and a fifth storage element 112. The number of the first storage element 104, the second storage element 106, the third storage element 108, the fourth storage element 110, and the fifth storage element 112 is for example only since the number may differ as well.

The I/O accelerator 102 communicates with the first storage element 104 through a channel interconnect element 114, such as a cable or printed circuit board. The first storage element 104, the second storage element 106, the third storage element 108, the fourth storage element 110, and the fifth storage element 112 utilize a similar interconnect technology with a number of instances of the channel interconnect element 114. The I/O accelerator 102 communicates with the first storage element 104, the second storage element 106, the third storage element 108, the fourth storage element 110, and the fifth storage element 112 through the channel interface 116 and a number of instances of the channel interconnect element 114.

The I/O accelerator 102 also supports a host interface 118. As an example, the host interface 118 is shown connected to a first host computer 120, a second host computer 122 and a network cloud 124, which represents all of the other host computers (not shown) attached through the network (not shown). The configuration shown is an example only, wherein the I/O accelerator 102 must be connected to at least one host computer and at least one storage element. The host interface 118 attaches to the first host computer 120 with a host interconnect 126, such as a cable.

The first host computer 120 may be running an application that requires data from storage. A read request for the required data is sent from the first host computer 120 to the I/O accelerator 102, through the host interconnect 126 to the host interface 118. The command is accepted by the I/O accelerator 102. The data to satisfy the read request command may reside on any or all of the first storage element 104, the second storage element 106, the third storage element 108, the fourth storage element 110, and the fifth storage element 112, attached to the channel interface 116. The I/O accelerator 102 appropriately issues the read command to the first storage element 104, the second storage element 106, the third storage element 108, the fourth storage element 110, or the fifth storage element 112. The requested data is presented through the channel interface 116 and the I/O accelerator 102 assembles the data in a client buffer that is dedicated to the requesting host system for the duration of the transfer.

Once the data transfer to the host interface 118 is initiated, the I/O accelerator 102 will not stop the transfer prior to the completion of the command unless the transfer is interrupted by the host. Data is retrieved from the first storage element 104, the second storage element 106, the third storage element 108, the fourth storage element 110, or the fifth storage element 112 on a continuous basis until the host request is satisfied or the command is terminated by the host. The required data is sent across the host interface 118 at the maximum rate the host can sustain.

Figure 2:
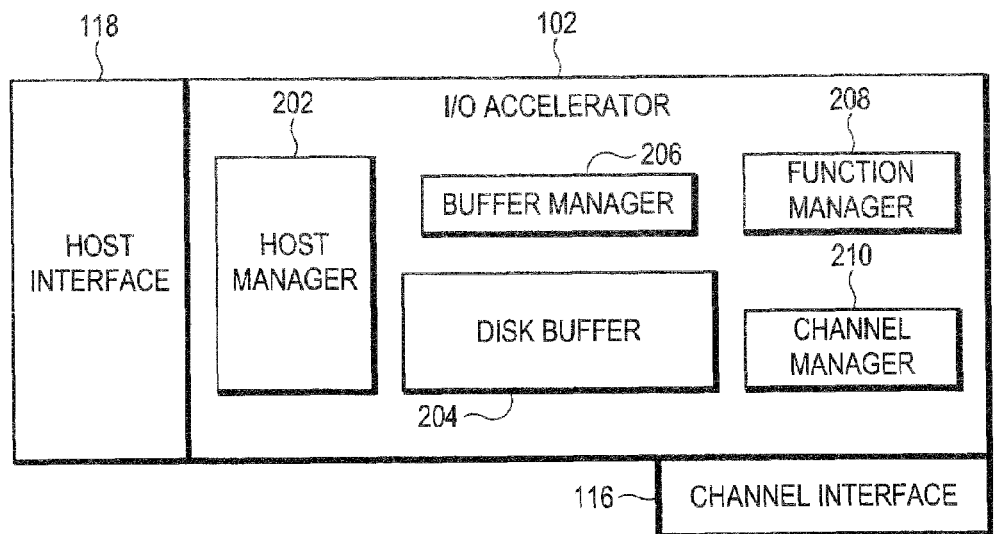
FIG. 2 is a more detailed block diagram of the I/O accelerator, as shown in FIG. 1.

Referring now to FIG. 2, therein is shown a more detailed block diagram of the I/O accelerator 102, as shown in FIG. 1. The block diagram shows the channel interface 116, which operates under the control of a channel manager 210, a disk buffer 204, such as a DRAM buffer that may be multiple terabytes in size, is controlled by a buffer manager 206, a function manager 208, a host manager 202 and the host interface 118.

When a read command is sent to the host interface 118, the host manager 202 accepts the command, monitors the interface performance of the requesting first host computer 120 and sends the functional request to the function manager 208. The function manager 208 performs the set-up operation to execute the read command by passing information to the channel manager 210 and the buffer manager 206. The buffer manager 206 receives the buffer size and performance information for the command execution from the function manager 208. The performance information is used to establish an interrupt threshold for the command. The interrupt threshold is defined as the number of bytes that the first host computer 120 is capable of transferring, at its maximum transfer rate, during the time that is required to pause another channel transfer and retrieve data for the client buffer in order to maintain the transfer to the first host computer. The number of bytes will be different for fast and slow versions of the first host computer. A client buffer is allocated in the disk buffer 204.

The client buffer of the disk buffer 204 may be several gigabytes in size, such that the client buffer may handle the entire file transfer to the host through the host interface 118 without interrupting the data transfer to or from the first host computer 120. The client buffer is sufficiently large for data transfers to and from the first host computer 120, so that the I/O accelerator 102 has sufficient time to work on transfers to or from storage for other applications of the first host computer 120 or other host computers in the network 124. The buffer manager 206 monitors the status of all client buffers within the disk buffer 204. The channel manager 210 generates the proper commands to send to the first storage element 104 of FIG. 1, the second storage element 106 of FIG. 1, the third storage element 108 of FIG. 1, the fourth storage element 110 of FIG. 1, the fifth storage element 112 of FIG. 1 or any combination of them. When data is available for the host command the channel manager 210 vectors the data to the proper location in the client buffer of the disk buffer 204. With sufficient data stored in the client buffer of the disk buffer 204, the buffer manager 206 signals the host manager 202 to initiate transfer through the host interface 118. The transfer is completely decoupled between the host interface 118 and the channel interface 116 and is coordinated by the buffer manager 206.

The client buffer will remain in the disk buffer 204 until the space is required to service another client and no other memory is available. If the data in the client buffer is requested again, by any host, it will be transferred from the disk buffer 204 without interaction with the first storage element 104 of FIG. 1, the second storage element 106 of FIG. 1, the third storage element 108 of FIG. 1, the fourth storage element 110 of FIG. 1, or the fifth storage element 112 of FIG. 1.

When concurrent commands arrive from two hosts, or a single host, a client buffer is established for each command. The commands are initiated in a priority order based on the host performance and the order of arrival. In order to prevent disk "thrashing", the first command to execute will be given priority to run to completion or establish sufficient data in the client buffer to allow the second command to start filling its client buffer. Once the second command takes priority, it will run to completion or be interrupted by the buffer manager 206 when the first client buffer reaches a low threshold. If the first client buffer reaches the low threshold, the first client again takes priority and continues executing its command to completion or interruption from the second client buffer reaching its low threshold. The thresholds are established based on desired performance of the host and the buffer fill rate.

Figure 3:
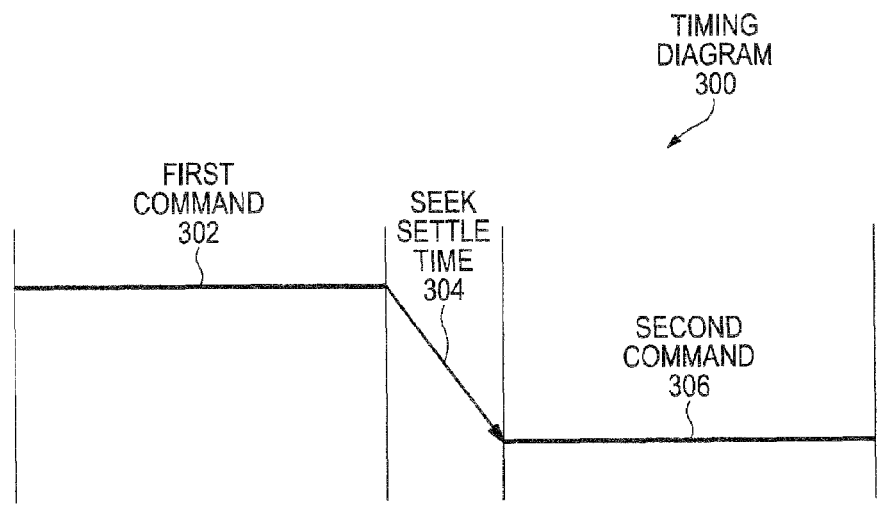
FIG. 3 is a timing diagram of an Enterprise level disk drive performing concurrent commands.

Referring now to FIG. 3, therein is shown a timing diagram 300 of an Enterprise level disk drive performing concurrent commands. The timing diagram 300 shows the execution of a first command 302 being paused to allow a second command 306 to transfer data. A seek settle time 304 transitions from the track of the first command 302 to the track of the second command 306. In the highest performance drives the seek settle time 304 can be from 1 mS to 10 mS depending the number of tracks crossed to get to the target track of the second command 306. The control of priority execution, with dynamic threshold values, prevents the disk from spending more time moving the head than reading or writing data.

The execution transition from the first command 302 to the second command 306 is triggered by the buffer manager 206, of FIG. 2. The buffer manager 206 may contain multiple control devices, such as microprocessors, that monitor the rate of data flow into and out of the client buffers. When the client buffer meets the criteria for a priority execution change, the command execution is paused and a new command is issued to the first storage element 104 of FIG. 1, the second storage element 106 of FIG. 1, the third storage element 108 of FIG. 1, the fourth storage element 110 of FIG. 1, the fifth storage element 112 of FIG. 1, or any combination of them.

Referring now to FIG. 4 therein is shown an operational diagram 400 for dynamic block size translation. The operational diagram 400 shows application data ingress to the disk buffer 204 of FIG. 2. The application data is in an application block size 404 optimized for the application. The first storage element 104 of FIG. 1, the second storage element 106 of FIG. 1, the third storage element 108 of FIG. 1, the fourth storage element 110 of FIG. 1, and the fifth storage element 112 of FIG. 1 may be formatted for a storage block size 406, different from the application block size 404. The data alignment and buffering is handled by the buffer manager 206 of FIG. 2 and the function manager 208 of FIG. 2. As the data is written and read by the application, the data alignment is maintained, independent of the formatted block size of the first storage element 104 of FIG. 1, the second storage element 106 of FIG. 1, the third storage element 108 of FIG. 1, the fourth storage element 110 of FIG. 1, and the fifth storage element 112 of FIG. 1. This function allows the I/O Accelerator 102 to optimize the capacity utilization of the first storage element 104 of FIG. 1, the second storage element 106 of FIG. 1, the third storage element 108 of FIG. 1, the fourth storage element 110 of FIG. 1, and the fifth storage element 112 of FIG. 1 and tune the I/O decoupling system 100, of FIG. 1, for maximum data throughput. The I/O Accelerator 102 adds flexibility to the data structure by decoupling the application block size 404 from the storage block size 406. If the first host computer 120 executes multiple applications with different application block size 404, the I/O Accelerator 102 adjusts for the application block size 404 in memory without any intervention and without altering the storage block size 406

Some video applications store digital movie or video data in many separate small files, one frame per file, while some applications store it as one large file. It is generally preferable to have the storage block size 406 be large to reduce random seek, but the size must be made to match the underlying access pattern of the data applications. But applications change over time, while disk format can be very time consuming and sometimes prohibitive to change. The use of the I/O Accelerator 102 allows the disk buffer 204 to hold the application data, so that the storage block size 406 can be made as large as possible to optimize for performance, while the disk buffer 204 provides the desired performance regardless of the access pattern.

Referring now to FIG. 5, therein is shown a flow chart of a system 500 for an I/O decoupling system in an embodiment of the present invention. The system 500 comprises in a block 502 comprising a command receipt step, wherein a connected host computer sends a new command to the host interface (118 of FIG. 1). The host manager (202 of FIG. 2) interprets the command and sends execution information to the function manager (208 of FIG. 2). Next, in a block 504 (command set-up step) therein the function manager analyzes the performance requirements for the new command. The function manager sends command set-up information to the buffer manager (206 of FIG. 2) including client buffer size and threshold offset. The buffer manager allocates physical DRAM space for the client buffer within the disk buffer (204 of FIG. 2). The function manager issues data gathering instructions to the channel manager (210 of FIG. 2). The channel manager gets client buffer vector from the buffer manager. In block 506 (command execution step), the channel manager issues command instructions to the channel interface (116 of FIG. 1). The channel interface 116 sends I/O commands to the storage elements (104, 106, 108, 110, 112 of FIG. 1), such as disk drives or RAID controllers. The storage elements return data (for Read command) or request data (for Write command) to the channel manager. The channel manager vectors data to the disk buffer during a Read command, or retrieves data from disk buffer during a Write command. The buffer manager monitors the data flow and verifies the threshold is not crossed. If the threshold is crossed the buffer manager interrupts the channel manager to elevate service priority. In block 508 (command completion step), the buffer manager interrupts the channel manager when data crosses threshold at command completion, channel manager notifies function manager to enable transfer end. Function Manager enables host manager for status after data complete; when client buffer is "empty." Buffer manager notifies function manager to enable data re-use or dynamic re-allocation.

It has been discovered that by utilizing a disk buffer, which may be multiple terabytes in length, a completely decoupled I/O transfer can take place in the system. The benefits are shared by the host system and the storage devices.

It has been discovered that the present invention thus has numerous aspects. An aspect is that the present invention is the uninterrupted transfer of complete large files helps boost system performance. Another aspect is the priority management system of allocating storage element activity prevents the disk drive "thrashing" seen in today's systems. The reduction in seek operations helps maintain the data transfer efficiency as well as reduce the power consumed by the storage elements. These and other valuable aspects of the present invention consequently further the state of the technology to at least the next level.

Thus, it has been discovered that an I/O decoupling system method and apparatus of the present invention furnish important and heretofore unknown and unavailable solutions, capabilities, and functional aspects for managing and storing very large files, such as video files for a video on demand system or for rich media production systems where frequent read/write requests are made to digital storage systems. The resulting processes and configurations are straightforward, cost-effective, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the scope of the included claims. All matters hithertofore set forth herein or shown in the accompanying drawings are to be interpreted in an illustrative and non-limiting sense.

We claim:

1. An apparatus, comprising:
    a storage interface configured to communicate with a storage system having a non-volatile storage component;
    a host interface configured to communicate with a plurality of clients;
    a cache configured to cache communications exchanged between the non-volatile storage component and the plurality of clients, the cache configured to associate buffers with the plurality of clients; and
    circuitry configured to:
    identify a data rate for transferring data from the apparatus, over the host interface, to one of the plurality of clients, wherein the identified data rate is based on an amount of data cached in the buffer for the receiving client and decoupled from asynchronous transfers over the storage interface; and
    stream the cached data to the receiving client according to the identified data rate that is decoupled from the asynchronous transfers.

2. The apparatus of claim 1, wherein the circuitry is further configured to:
    detect expected disruption of a data transfer over the host interface based on monitoring the cache;
    re-prioritize asynchronous data transfers over the storage interface in response to detecting expected disruption of the data transfer, the re-prioritization causing a current asynchronous data transfer from the non-volatile storage component to be halted in order to process a different asynchronous data transfer from the non-volatile storage component; and
    maintain a transfer priority established by the re-prioritization until a new expected data transfer disruption is detected;
    wherein the halted asynchronous data transfer is not resumed until an expected disruption of a data transfer associated with the halted asynchronous data transfer occurs.

3. The apparatus of claim 2, wherein the processed asynchronous transfer is continued subsequent to resolution of the detected expected disruption and independently of a history of priority between the asynchronous data transfers.

4. The apparatus of claim 1, wherein the plurality of clients are a plurality of software applications operating on host computers that are coupled to the host interface.

5. The apparatus of claim 1, wherein the host interface includes a network interface.

6. The apparatus of claim 1, wherein the storage interface is configurable for communicating with a Redundant Array of Inexpensive Disks (RAID) controller.

7. The apparatus of claim 1, wherein data in the data transfer over the host interface is formatted according to a first block size that is smaller than a second block size of the asynchronous transfers.

8. The apparatus of claim 1, wherein the circuitry is configured to reformat asynchronously received data into a different block size for transmission over the host interface.

9. The apparatus of claim 1, wherein the cache comprises volatile memory.

10. The apparatus of claim 1, wherein the non-volatile storage is initialized by a file system, the initialization allocating fixed data blocks each having a first size on the non-volatile storage and mapping the allocated fixed data blocks to the file system, and wherein the first size of each fixed data block is larger than a second size of a file to be requested by an application; and
    wherein the circuitry is further configured to:

transfer a block of data containing the file from the non-volatile storage over the storage interface to cache the block of data, the transferred block of data being of the first size and containing the file to be requested and other data including at least a portion of another file;

parse data from the block into a plurality of smaller blocks and store the plurality of smaller blocks on the cache in one of the buffers associated with the application;

in response to a request from the application for the file, access only a subset of the smaller blocks and transfer data from the accessed smaller blocks to one of the clients that is associated with the application, wherein data from a remaining one of the smaller blocks is not transferred to the associated client in response to the request for the file.

11. The apparatus of claim 1, wherein the host interface is configured to connect to an I/O port of a personal computer, server, or workstation.

12. The apparatus of claim 11, wherein the storage interface is configured to connect to an I/O port of a disk-based storage device.

13. The apparatus of claim 1, wherein the data stored on the non-volatile storage component is formatted using a first block size format that maps to a file system on at least one of the clients, wherein the circuitry is further configured to align data stored in the cache according to communications exchanged with the plurality of clients such that the data stored in the cache is organized according to a second block size format that is different than the first block size format.

14. The apparatus of claim 1, wherein the identified data rate is an isochronous data rate, and wherein the apparatus proxies isochronous data rate identification for the storage system and frees the storage system from having to provide isochronous data transfers.

15. An apparatus, comprising:
a storage interface configured to communicate with a storage component;
a host interface configured to communicate with a plurality of clients;
a buffering component configured to buffer communications exchanged between the storage component and the plurality of clients, the buffering component configured to associate buffers with the plurality of clients; and
circuitry configured to:
identify a data rate for transferring data from the apparatus, over the host interface, to one of the plurality of clients, wherein the identified data rate is based on an amount of data existing in the buffer for the receiving client and decoupled from asynchronous transfers over the storage interface; and
stream the buffered data to the receiving client according to the identified data rate that is decoupled from the asynchronous transfers;
wherein the circuitry is further configured to align data stored in the buffering component according to communications exchanged with the plurality of clients such that the data stored in the buffering component is organized according to a first block size format that is different than a second block size format used for organizing the data stored on the storage component.

16. The apparatus of claim 15, wherein the storage component comprises non-volatile memory and the buffering component comprises volatile memory.

17. The apparatus of claim 15, wherein the identified data rate is an isochronous data rate, and wherein the apparatus proxies isochronous data rate identification for the storage system and frees the storage system from having to provide isochronous data transfers.

18. An apparatus, comprising:
means for communicating with a storage system having a non-volatile storage component;
means for communicating with a client and providing the client access through the apparatus to data stored on the non-volatile storage component;
means for selecting a data rate for transferring data from the apparatus, over the client communication means, to the client, wherein the selected data rate is based on an amount of data cached on the apparatus and decoupled from asynchronous transfers over the non-volatile storage component communication means; and
means for transferring the cached data to the client according to the selected data rate.

19. The apparatus of claim 18, further comprising:
means for detecting expected disruption of a data transfer between the apparatus and the client;
means for re-prioritizing asynchronous data transfers between the apparatus and the non-volatile storage component in response to detecting expected disruption of the data transfer; and
means for maintaining a transfer priority established by the re-prioritization until a new expected data transfer disruption is detected;
wherein the apparatus is configured to continue an asynchronous transfer selected according to the re-prioritization until completion unless a new re-prioritization occurs according to the detection means.

20. The apparatus of claim 19, further comprising:
means for storing the asynchronous data transfers in buffers associated with host computers coupled to the client communication means;
means for monitoring depletion of the buffers; and
means for detecting the expected disruptions according to the monitoring means.

21. The apparatus of claim 20, further comprising:
means for identifying transfer rates of the host computers;
means for controlling data transfers over the client communication means according to the identified transfer rates;
means for establishing interrupt thresholds for each buffer according to the identified transfer rates and buffer size; and
means for monitoring buffer depletion according to the established interrupt thresholds.

22. The apparatus of claim 18, further comprising:
means for identifying transfer rates of host computers coupled to the client communication means; and
means for controlling is data rate selection according to the identified transfer rates.

23. The apparatus of claim 18, further comprising a volatile memory to cache at least a portion of the data stored on the non-volatile memory component.

24. The apparatus of claim 18, wherein the identified data rate is an isochronous data rate, and wherein the apparatus proxies isochronous data rate identification for the storage system and frees the storage system from having to provide isochronous data transfers.

25. An apparatus, comprising:
a storage interface configured to communicate with a storage system having a non-volatile storage component;
a host interface configured to communicate with a plurality of clients;

a cache configured to cache communications exchanged between the non-volatile storage component and the plurality of clients, the cache configured to associate a buffer with each client; and circuitry configured to:

identify a data rate for transferring data from the apparatus, over the host interface, to one of the plurality of clients, wherein the identified data rate is based on an amount of data existing in the buffer for the receiving client and decoupled from asynchronous transfers over the storage interface.

26. The apparatus of claim 25, wherein the circuitry is further configured to:

transfer data over the host interface between the plurality of clients and their associated buffers;

monitor buffer capacity to detect when one of the data transfers over the host interface is expected to deplete a respective one of the buffers such that the determined data rate from that detected buffer is expected to be disrupted;

halt a current asynchronous data transfer from the non-volatile storage component to one of the non-detected buffers in response to the detection;

process an asynchronous data transfer from the non-volatile storage component to the detected buffer to prevent disruption of the determined data rate, and continue to monitor the other non-detected buffers during the processing; and continue the processed asynchronous data transfer until the continued monitoring detects a different buffer;

wherein the processed asynchronous data transfer is continued independently of resolving the expected depletion as long as no other buffers corresponding to the non-volatile storage component are detected.

27. The apparatus of claim 26, wherein the processed asynchronous data transfer is continued until the earlier of completion or detection of another buffer associated with the non-volatile storage component to maximize a continuous burst read from a disk in the non-volatile storage component.

28. The apparatus of claim 27, wherein the continuation of the processed asynchronous data transfer continues without halting unless a new detection occurs thereby eliminating a seek penalty.

29. The apparatus of claim 26, wherein the circuitry is configured to delay resumption of the halted asynchronous data transfer until detecting expected disruption of a data transfer from the buffer associated with the halted asynchronous data transfer.

30. The apparatus of claim 26, wherein the non-volatile storage component is disk-based, and wherein a delay in resuming of the halted asynchronous data transfer avoids thrashing between disk locations.

31. The apparatus of claim 25, wherein the plurality of clients are software programs operating on a host computer.

32. The apparatus of claim 25, wherein information is formatted on the buffers independently of a formatting of the non-volatile storage component.

33. The apparatus of claim 25, wherein the cache comprises volatile memory.

34. The apparatus of claim 25, wherein the identified data rate is an isochronous data rate, and wherein the apparatus proxies isochronous data rate identification for the storage system and frees the storage system from having to provide isochronous data transfers.

* * * * *

UNITED STATES PATENT AND TRADEMARK OFFICE
CERTIFICATE OF CORRECTION

PATENT NO. : 7,640,381 B1
APPLICATION NO. : 11/325970
DATED : December 29, 2009
INVENTOR(S) : Zhang et al.

It is certified that error appears in the above-identified patent and that said Letters Patent is hereby corrected as shown below:

Title Page, section (76), line 5, please replace "La.," with --Lane.,--.
Title Page, section (57), line 4, please replace "buffer manager" with --buffer manager,--.
At column 10, line 52, please replace "controlling is data" with --controlling data--.

Signed and Sealed this

Twelfth Day of October, 2010

David J. Kappos
*Director of the United States Patent and Trademark Office*